Aug. 2, 1927.
W. M. CHACE
THERMOMETER
Filed Feb. 4, 1924
1,637,805
2 Sheets-Sheet 1
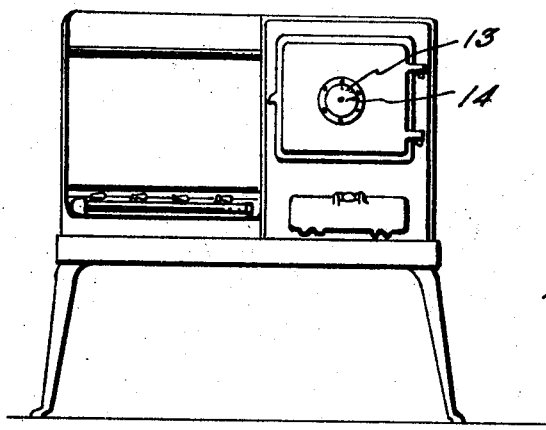
Fig. 1
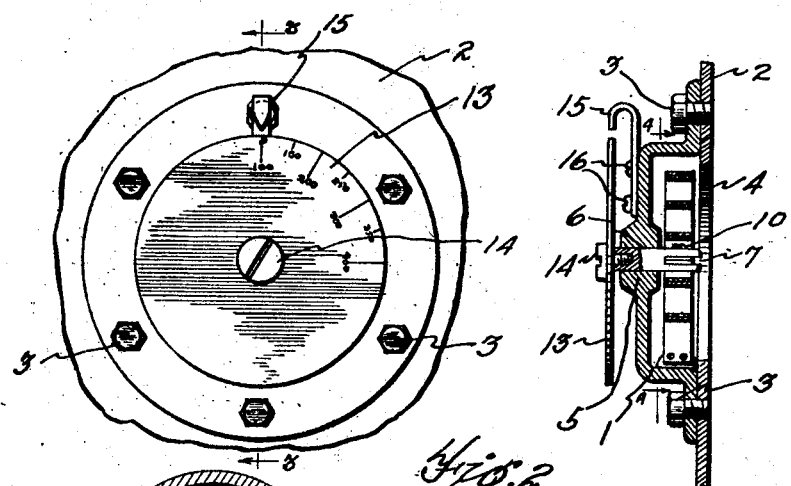
Fig. 2
Fig. 3
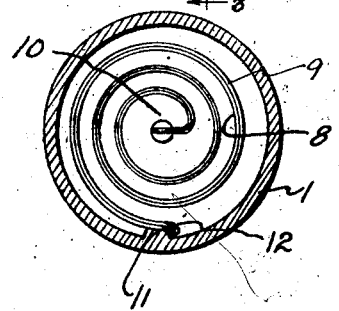
Fig. 4
INVENTOR.
BY William M. Chace
ATTORNEY.

Aug. 2, 1927.

W. M. CHACE

THERMOMETER

Filed Feb. 4, 1924

INVENTOR.
William M. Chace
BY
Charles E. Winey
ATTORNEY.

Patented Aug. 2, 1927.

1,637,805

UNITED STATES PATENT OFFICE.

WILLIAM M. CHACE, OF DETROIT, MICHIGAN.

THERMOMETER.

Application filed February 4, 1924. Serial No. 690,524.

This invention relates to thermometers and the object of the invention is to provide a thermometer adapted for a multiplicity of uses and which will accurately indicate temperature in degrees.

Another object of the invention is to provide a thermometer in which the indicating dial may be positioned at a distance from the operating unit permitting the device to be used for indicating temperatures of ovens, refrigerators, and other closed chambers in which the temperature reading may be more easily taken from the outside of the chamber.

A further object of the invention is to provide a thermometer including a bi-metallic thermostatic element adapted to rotate a dial, a stationary pointer being provided to indicate the correct temperature reading on the dial.

Another object of the invention is to provide a thermometer including a casing which may be attached over an opening provided in the chamber with which the thermometer is to be used, the opening providing a means for the passing of fluid into the casing to the thermostatic element.

These objects and the several novel features of the invention are hereinafter more fully described and claimed and the preferred form of construction by which these objects are attained is shown in the accompanying drawings in which—

Fig. 1 is an elevation of a cooking oven equipped with my thermometer.

Fig. 2 is an enlarged elevation of the thermometer.

Fig. 3 is a section taken on line 3—3 of Fig. 2.

Fig. 4 is a section taken on line 4—4 of Fig. 3.

Figure 5:
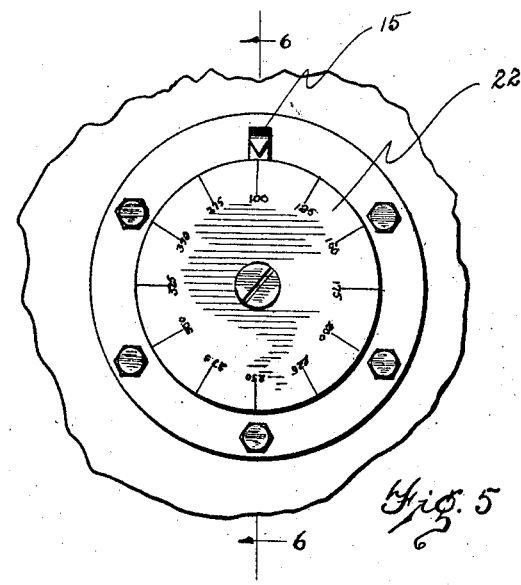
Fig. 5 is a view of an alternative type of thermometer.

As shown more particularly in Fig. 3 the thermometer comprises a casing 1 which is adapted to be attached to the casing 2 of an oven, refrigerator, liquid tank or other closed chamber by means of the bolts 3 and the wall 2 is provided with an opening 4 to allow air or other fluid to enter the casing 1. The casing 1 is provided with a bearing 5 in which a shaft 6 is rotatably mounted and this shaft 6 is provided with a slot 7 within the casing. A thermostatic element is provided comprising two strips 8 and 9, the strip 8 being formed of a metal having a high co-efficient of expansion or contraction under temperature changes and the strip 9 is formed of a metal having a lower co-efficient of expansion or contraction under temperature changes and these strips of metal are secured together throughout their length as is the usual construction. This bi-metallic element is curled into the form of a spiral as shown in Fig. 4 and one end thereof is secured in the slot 7 of the shaft 6 by the screw 10 and the other end thereof is secured to a lug 11 in the casing 1 by the screws 12. A dial 13 is secured to the shaft 6 exteriorly of the casing by means of a screw 14 and this dial as shown in Fig. 2 is provided with temperature readings through about one quarter of its periphery within the limits of the expansion and contraction of the bi-metallic element. For use in cooking ovens the temperature readings may be graduated from 100 to 400 degrees or higher if desired and a bi-metallic element is used which is particularly adapted to this range of temperature changes. For normal use as a thermometer the dial is graduated for normal atmospheric temperature changes, and a bi-metallic element particularly adapted for this temperature range is utilized. It can thus be seen that by using different thermostatic elements and corresponding dials that this type of thermometer may be manufactured for any definite temperature range. A pointer 15 is secured to the casing 1 by the screws 16 and indicates by means of the dial the temperature within the casing 1.

In operation as the temperature rises in the casing 1 the bi-metallic element 8 expands thus expanding the thermostatic element and turning the shaft 6 and dial 13 in a counter-clockwise direction to position the correct temperature reading opposite the pointer 15. Upon decrease of temperature in the casing 1 the bi-metallic element contracts thus turning the dial 13 and shaft 6 in a clock-wise direction to bring the correct temperature reading opposite the pointer 15. This device may be used to indicate the temperature of any fluid either gas or liquid and may be used in an open room as well as in closed chambers.

Figure 6:
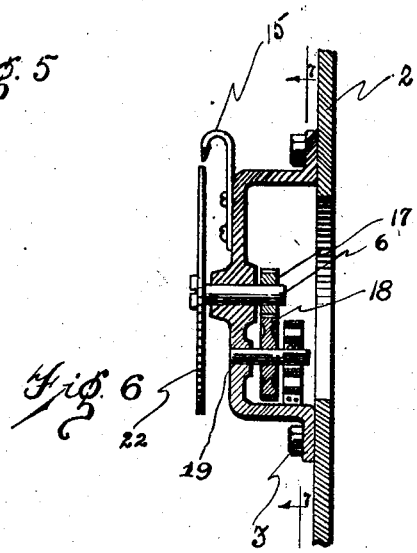
Fig. 6 is a section taken on line 6—6 of Fig. 5.
Figure 7:
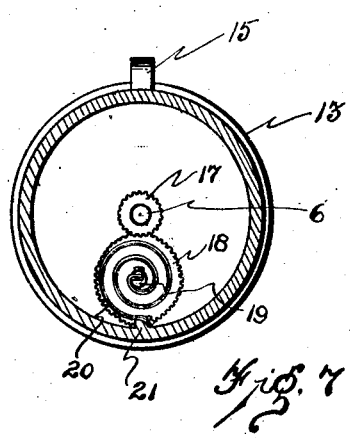
Fig. 7 is a section taken on line 7—7 of Fig. 6.

An alternative form of the device is shown in Figs. 5, 6 and 7 in which the shaft 6 is provided with a small gear 17 secured thereto which meshes with a larger gear 18 on a shaft 19 which is rotatably mounted in the casing 1. A bi-metallic thermostatic element 20 is secured at one end in a slot provided in the shaft 19 and is secured at the opposite end to a lug 21 provided on the interior of the casing 1. In the type shown in Figs. 2, 3 and 4 the thermostatic element will turn the shaft 6 and dial 13 about a quarter of a turn during a change of temperature from one extreme to the other and the thermostatic element 20 shown in Fig. 7 will turn the shaft 19 about a quarter of a turn during a change of temperatures from one extreme to the other but by means of the gear 18 which is in a four to one ratio with the gear 17 the shaft 6 may be given a complete revolution thus turning the dial 22 through a complete revolution. For this reason the dial 22 may be graduated through its entire periphery thus giving a more accurate reading of the temperatures.

The shafts 6 and 19 are rotatable in the bearings and it is to be understood that these shafts should be held from any material longitudinal movement. The shaft 19 of Fig. 6 will naturally remain in its position in the bearing due to the connection of the thermostatic element thereto and the shaft 6 and the bearing member for the shaft 6 should be of such length as to prevent moving the gears out of mesh. In Fig. 3 the shaft 6 is held from material longitudinal movement by reason of attachment of the bimetallic element at the inner end and the dial at the outer end.

From the foregoing description it becomes evident that the device is very simple and efficient in operation, will not easily get out of order, that the dial may be accurately set by means of the screw 14 to give exact temperature readings and provides a device which accomplishes the objects described.

Having thus fully described my invention, its utility and mode of operation, what I claim and desire to secure by Letters Patent of the United States is—

A thermometer for use with receptacles or chambers comprising the combination with the chamber wall having an opening therein, of a cup shaped casing of metal open on one side and provided thereon with a peripheral flange, the opposite side being closed, means for attaching the casing to the exterior of the chamber wall covering the said opening, the closed end of the said casing having a central aperture, a shaft rotatably mounted therein and projecting on opposite sides of the said end of the casing, a bimetallic element on the inner end of the said shaft adapted by expansion and contraction to turn the same, a wheel on the outer end of the shaft having graduations arranged about the periphery thereof, and a stationary pointer member secured to the casing and having an end portion lying contiguous to the periphery of the wheel.

In testimony whereof, I sign this specification.

WILLIAM M. CHACE.